United States Patent [19]
Campen et al.

[11] Patent Number: 5,505,856
[45] Date of Patent: Apr. 9, 1996

[54] PROCESS FOR THE PURIFICATION OF CONTAMINATED WATER BY ACTIVATED OZONE

[75] Inventors: Jan P. Campen, Wassenaar, Netherlands; John-Antoine Moser, Zurich, Switzerland

[73] Assignee: ECO Purification Systems, BV, Rijiswijk, Netherlands

[21] Appl. No.: 382,414

[22] Filed: Feb. 2, 1995

Related U.S. Application Data

[63] Continuation-in-part of Ser. No. 51,564, Apr. 26, 1993, abandoned, which is a continuation of Ser. No. 777,260, Jan. 17, 1992, abandoned which is a national stage of International Application No. of PCT/NL90/00075, May 23, 1990.

[30] Foreign Application Priority Data

May 23, 1989 [NL] Netherlands ............................ 8901289
Jun. 5, 1989 [NL] Netherlands ............................ 8901420

[51] Int. Cl.$^6$ ................................. C02F 1/28; C02F 1/78
[52] U.S. Cl. .................... 210/668; 210/669; 210/673; 210/677; 210/679; 210/694; 210/748; 210/760; 210/763; 210/765
[58] Field of Search ...................... 210/663, 668, 210/670, 673, 679, 760, 669, 748, 763, 192, 677, 694, 765

[56] References Cited

U.S. PATENT DOCUMENTS

| | | | |
|---|---|---|---|
| 3,510,265 | 5/1970 | Kawahata | 210/192 |
| 3,755,157 | 8/1973 | Wisfeld | 210/760 |
| 3,779,909 | 12/1973 | Wisfeld | 210/760 |
| 3,924,139 | 12/1975 | Hirose et al. | 210/199 |
| 4,053,396 | 10/1977 | Trense et al. | 210/673 |
| 4,098,691 | 7/1978 | Filby | 210/673 |
| 4,137,162 | 1/1979 | Mohri et al. | 210/694 |
| 4,176,061 | 11/1979 | Stopka | 210/760 |
| 4,252,654 | 2/1981 | Leitzke et al. | 210/760 |
| 4,255,257 | 3/1981 | Greiner et al. | 210/760 |
| 4,395,337 | 7/1983 | Ciepiela | 210/703 |
| 4,517,094 | 5/1985 | Beall | 210/664 |
| 4,526,692 | 7/1985 | Yohe et al. | 210/747 |
| 4,544,488 | 10/1985 | O'Brien | 210/664 |
| 4,648,977 | 3/1987 | Garg et al. | 210/673 |
| 4,676,908 | 6/1987 | Ciepiela et al. | 210/667 |

(List continued on next page.)

FOREIGN PATENT DOCUMENTS

| | | |
|---|---|---|
| 2291687 | 6/1976 | France . |
| 2729760 | 1/1979 | Germany . |
| 52-051754 | 4/1977 | Japan . |
| 53-113790 | 4/1978 | Japan . |
| 62-081350 | 4/1987 | Japan . |
| 1-900092 | 4/1989 | Japan . |
| 296272 | 5/1965 | Netherlands . |

OTHER PUBLICATIONS

"Use of photo-ozone/UV for groundwater treatment", *Wasser Berlin '89*, Apr. 1989, by P. Piscaer et al, pp. I.4.1–I.4.7.
T. K. Underbrink et al, "Removal of TCE, PCE and CTC from a contaminated groundwaer using UV/ozone," *Wasser Brlin '89*, Apr. 10–16, 1989, International Ozone Assocation, pp. V.4.1–V. 4.10.
"Nieuwe grondwaterzuiveringstechnieken bij bodemsanering", Rijkswateerstaat–Dienst Binnenwateren/RIZA, Report No. 88.028, Aug. 1988, pp. 69–73 Grontmij NV, De Bilt, NL.

*Primary Examiner*—Cynthia L. Nessler
*Attorney, Agent, or Firm*—Lowe, Price, LeBlanc & Becker

[57] ABSTRACT

A process is provided for the purification of water which is contaminated with environmentally undesirable components, such as halogenated hydrocarbons, wherein the contaminated water or the gaseous and/or liquid components present therein or derived therefrom are subjected to at least two of the following treatments: treatment with ozone, treatment of UV radiation, treatment with a solid catalyst. A combined treatment of ozone and a solid catalyst, such as activated carbon, is preferred. An apparatus for a co-current or countercurrent realization of the purification process is also provided.

14 Claims, 4 Drawing Sheets

U.S. PATENT DOCUMENTS

| | | | |
|---|---|---|---|
| 4,694,179 | 9/1987 | Lew et al. | 210/760 |
| 4,696,749 | 9/1987 | Habermann et al. | 210/763 |
| 4,735,728 | 4/1988 | Wemhoff | 210/673 |
| 4,786,418 | 11/1988 | Garg et al. | 210/673 |
| 4,855,123 | 8/1989 | Suzuki et al. | 210/760 |
| 4,954,469 | 9/1990 | Robinson | 210/694 |
| 4,971,687 | 11/1990 | Anderson | 210/232 |
| 5,068,040 | 11/1991 | Jackson | 210/760 |
| 5,075,016 | 12/1991 | Barnes | 210/760 |
| 5,087,374 | 2/1992 | Ding | 210/673 |
| 5,120,453 | 6/1992 | Frame et al. | 210/759 |
| 5,141,636 | 8/1992 | Flanagan et al. | 210/748 |
| 5,236,602 | 8/1993 | Jackson | 210/760 |
| 5,248,395 | 9/1993 | Rastelli et al. | 203/41 |
| 5,376,285 | 12/1994 | Kurek et al. | 210/759 |

PROCESS FOR THE PURIFICATION OF CONTAMINATED WATER BY ACTIVATED OZONE

CROSS REFERENCE TO RELATED APPLICATIONS

This application is a continuation-in-part of U.S. patent application Ser. No. 08/051,564 filed Feb. 26, 1993 now abandoned which was in turn a continuation of application Ser. No. 07/777,260 filed Jan. 17, 1992 and now abandoned, which was a 371 of PCT/NL90/00075 filed May 23, 1990.

FIELD OF THE INVENTION

This invention relates to a process for the purification of water contaminated with, for example, halogenated hydrocarbons, with activated ozone. The contaminated water may come available as ground water from waste deposits, but also as direct effluents from housing activities, urban conglomerates and industries.

BACKGROUND OF THE INVENTION

From an environmental point of view, such effluents cannot be discharged without a thorough purification. Most current technologies like concentration/incineration, wet air oxidation, biotreating, etc., have distinct disadvantages. They are either not economically viable, generate secondary waste problems or do not achieve sufficiently low residual concentrations for environmentally acceptable solutions.

SUMMARY OF THE INVENTION

The invention provides a solution for the above-mentioned problems. It is applicable to a variety of toxic components in waste streams like halogenated hydrocarbons, including chlorine and bromine containing compounds, dioxines and PCB's, pesticides, insecticides, (poly-cyclic) aromatics, cyanides, (glycol) esters, organic acids, alcohols, hydrocarbons, etc., as well as microorganisms.

The process according to the invention can be applied in the vapor phase (volatile components), as well as in the liquid phase. In both cases the active reagents are assumed to be oxidative radicals derived from activated ozone either by short wave UV radiation or by a solid catalyst.

If UV radiation is applied at a wavelength below 200 nm, and preferably at 185 nm, ozone can be produced from oxygen containing gas as well. At a wavelength in excess of 200 nm and more specifically at 245 nm UV radiation only activates ozone, but does not produce additional ozone.

As a catalyst, a number of solid components can be used. Good results have been obtained using activated carbon (surface area 400–800 $m^2/g$). Alumina and silica can also be used. In general, solid components and mixtures thereof can be used which have an absorption capability or affinity to the toxic component to be treated, as well as to ozone. In practice, the solid catalyst should have a surface area of at least 50 $m^2/g$ and a pore volume greater than 0.1 $cm^3/g$.

In the vapor phase, the reactions take place very fast (within a few seconds at ambient temperature). In the liquid phase, ozone is injected through a diffuser or an injection system such as a venturi; the reaction proceeds much slower than in the vapor phase. For many applications, a combination of gas treatment and liquid phase treatment is favorable.

Because the reaction proceeds reasonably fast at ambient temperature, higher temperatures are usually not required. However, treatment at higher temperatures is feasible and often preferable, in particular, when a solid catalyst is applied.

As a particular embodiment of the process according to the invention, contaminated water is purified by treating it with at least a solid catalyst, such as activated carbon, and the catalyst is continuously or semicontinuously regenerated with ozone. The activated carbon may be present as granular packing material or as a coating on inert packing material as will be obvious to those skilled in the art.

The invention can be conducted in several types of equipment, e.g., co-current (liquid and ozone gas in the same direction) or countercurrent in a stripping tower.

DETAILED DESCRIPTION OF THE PREFERRED EMBODIMENT

Figure 1:
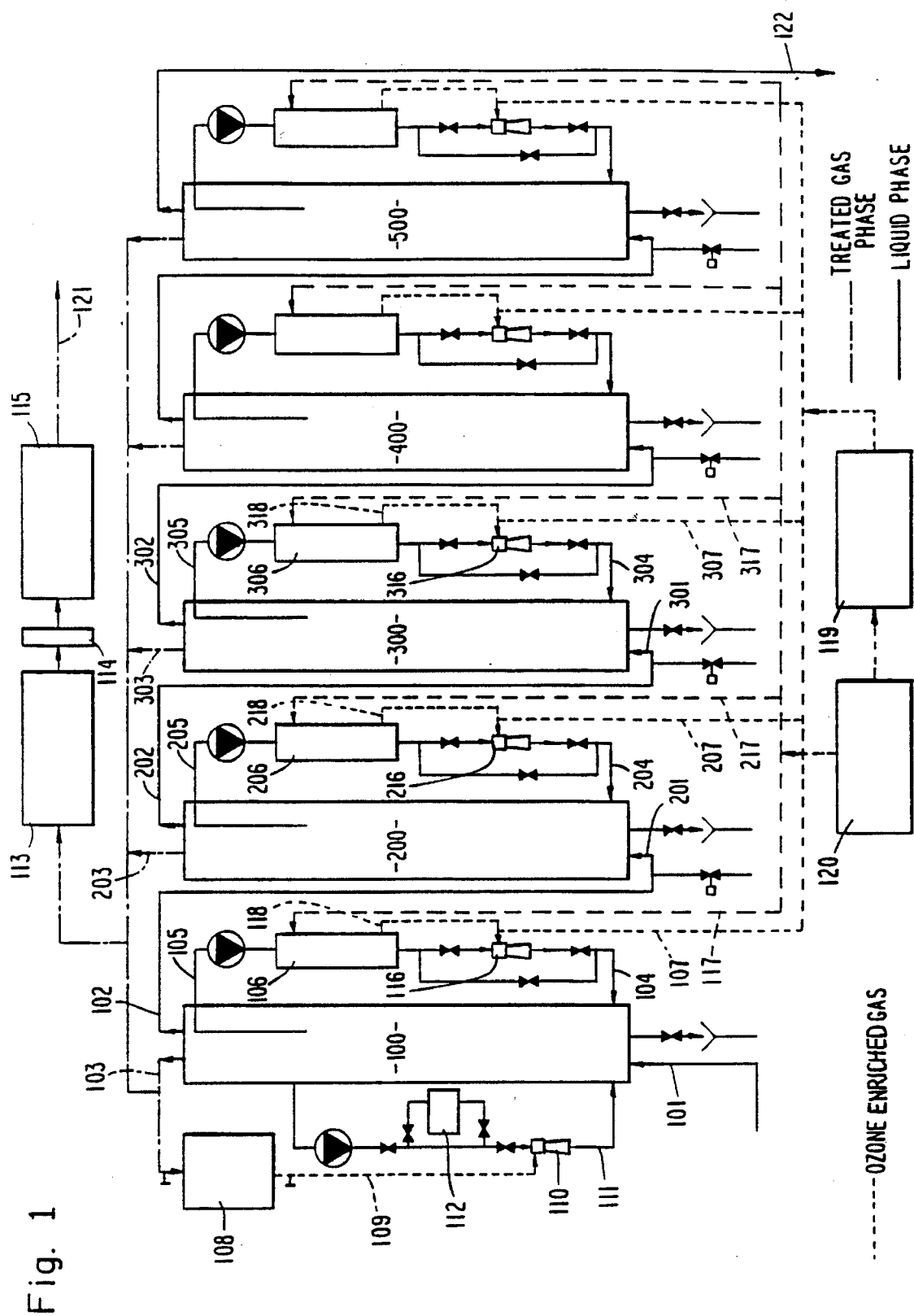
FIG. 1 illustrates co-current equipment useful for carrying out the invention.

Co-current flow is illustrated in FIG. 1. The apparatus consists of 1–10 reactors in series and was used for purifying the ground water of the Volgermeerpolder in the Netherlands. The conversion obtained with ozone/UV in the liquid phase and with ozone/activated carbon in the vapor phase are given in Table 1. It will be seen that, e.g., a toxic component like monochlorobenzene is degraded with an efficiency of 99.99%. The products were mainly water, carbon dioxide and NaCl (after neutralization of the HCl formed).

TABLE 1

GROUNDWATER PURIFICATION VOLGERMEERPOLDER

| Contaminant | Influent Level (ppb) | Effluent Level (ppb) | Local Limits for Discharge on Surface Water (ppb) |
|---|---|---|---|
| monochlorobenzene | 7900 | 1.0 | 1.0 |
| chlorophenols | 500 | 0.3 | 1.0 |
| EOCl | 810 | 3.3 | 5.0 |
| polycyclic aromatics | 40 | 0.6 | 1.0 |
| naphthalene | 25 | 0.5 | 1.0 |
| phenol | 27 | 0.5 | 1.0 |
| alkylphenols | 320 | 0.2 | 1.0 |
| benzene | 1400 | 0.5 | 1.0 |

In the apparatus according to this invention, a variety of toxic components can be degraded. The apparatus consists of from 1 up to 10 reactors (100,200, 300, . . .) which can be columns packed with solid fillings or solid catalysts. The said reactors have a contaminated water supply (101,201, 301, . . .), a water discharge (102, 202, 302, . . .) and a gas discharge (103, 203, 303, . . .); further, the reactors (100,

200, 300, . . .) are equipped with a recycle supply (104, 204, 304, . . .) for ozone containing liquid and a recycle discharge (105, 205, 305, . . .) for ozone depleted liquid, whereby a UV treating unit (106, 206, 306, . . .) and/or an ozone supply (107, 207, 307, . . .) can be included between the recycle supply (104, 204, 304, . . .) and the recycling discharge (105, 205, 305, . . .).

The gas discharge 103 which is connected to a UV treating unit 108 and/or the gas discharge 109 of the UV treating unit 108 is fed to a venturi 110 incorporated in a liquid recycle loop 111, which loop is connected to a reactor 100. In the liquid recycle loop 111, an electromagnetic water treatment installation 112 for eliminated metals such as iron or calcium can be incorporated.

The ozone supply (107, 207, 307, . . .) can advantageously be provided via an injection system such as a venturi (116, 216, 316, . . .) connected to the water recycle loop (104, 204, 304, . . .).

As a result of intense mixing of ozone (gas) and water as well as a result of the presence of the recycle loops, the reactions take place both in the water phase and in the vapor phase. After the ozone treatment, the residual gases are purified by an "active filter" 114 containing a solid catalyst as specified above. If necessary, additional ozone can be added just before the catalyst layer.

The purified gases can be discharged into the air 121 and the purified water can in general be discharged 122 in to the local surface water.

The invention can also be applied countercurrently. The apparatus of FIG. 2 comprises a stripping tower 1 having a supply 2 for gas and/or gas containing liquid on the lower side, and on the upper side both a liquid supply 3 and a gas discharge 4 which is connected to a UV treating unit 5, 6 and to an ozone supply unit 7. The discharge of the UV treating unit(s) 5, 6 is connected to a liquid supply 2 of a recycle loop 8. A stripping tower is particularly advantageous when the majority of the toxic components are volatile and the heavy components can be oxidized relatively easily. In that case, a single stripping tower would be sufficient, but 2–5 towers can be used as well. The gases leaving the tower 9 may contain residual toxic components. These can be degraded with additional ozone 11 in a separate reactor 10 containing a solid catalyst as specified above. Also in the stripping tower, the use of catalyst rather than a conventional filling material will, in most cases, be preferable.

Figure 2:
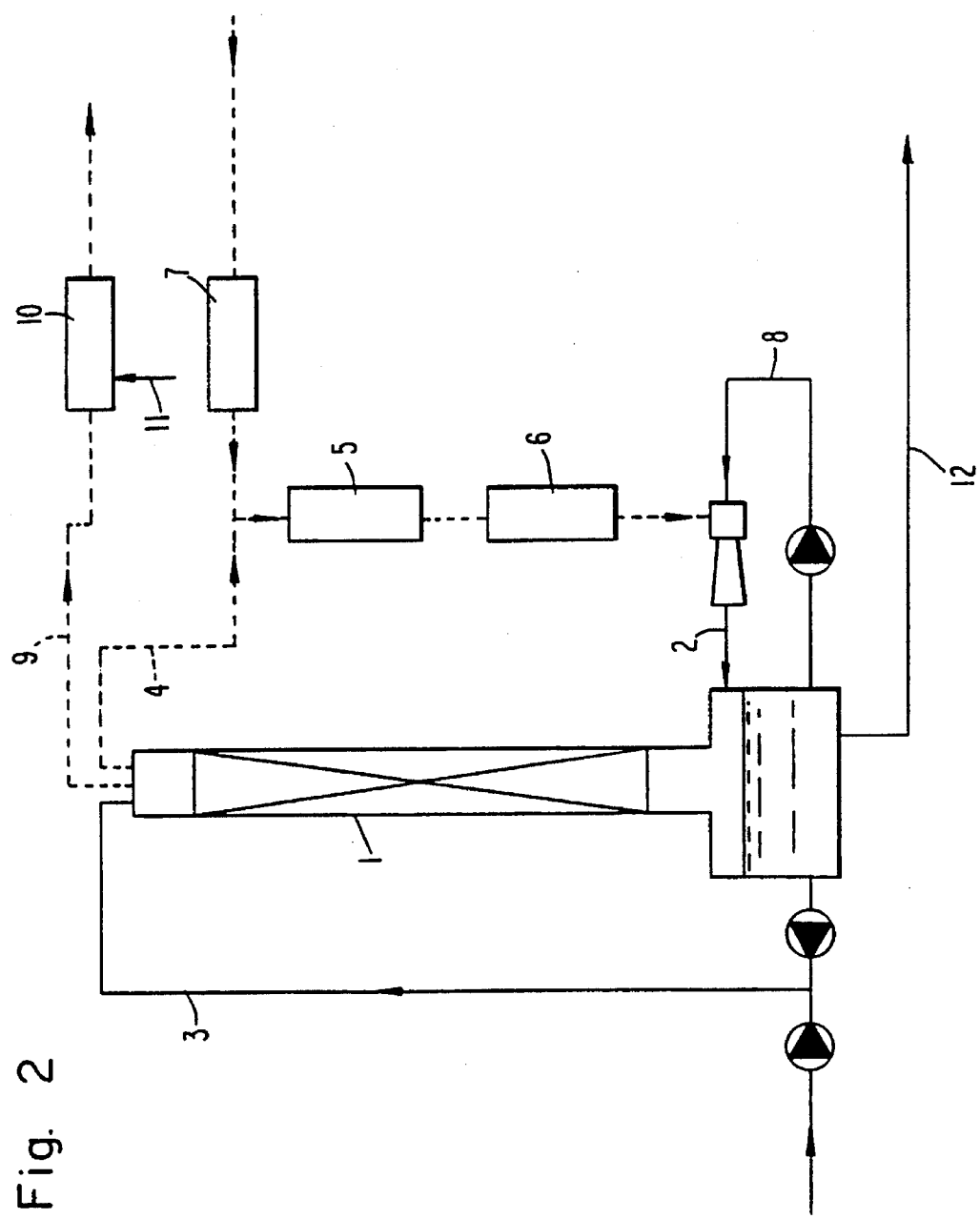
FIG. 2 illustrates countercurrent equipment including a stripping tower, and also useful for carrying out the invention.

The stripping tower as described in FIG. 2 was applied to purifying an industrial waste stream containing 7,431 mg/l of dichloromethane. It was shown that by adding sufficient caustic soda to neutralize the HCl formed and by using ozone/UV as the oxidizing agent, the effluent contained 68 mg/l only, thus achieving a conversion of 99.1%. By using active carbon and silica as a catalyst in combination with ozone a conversion of 99.9% was achieved.

Figure 3:
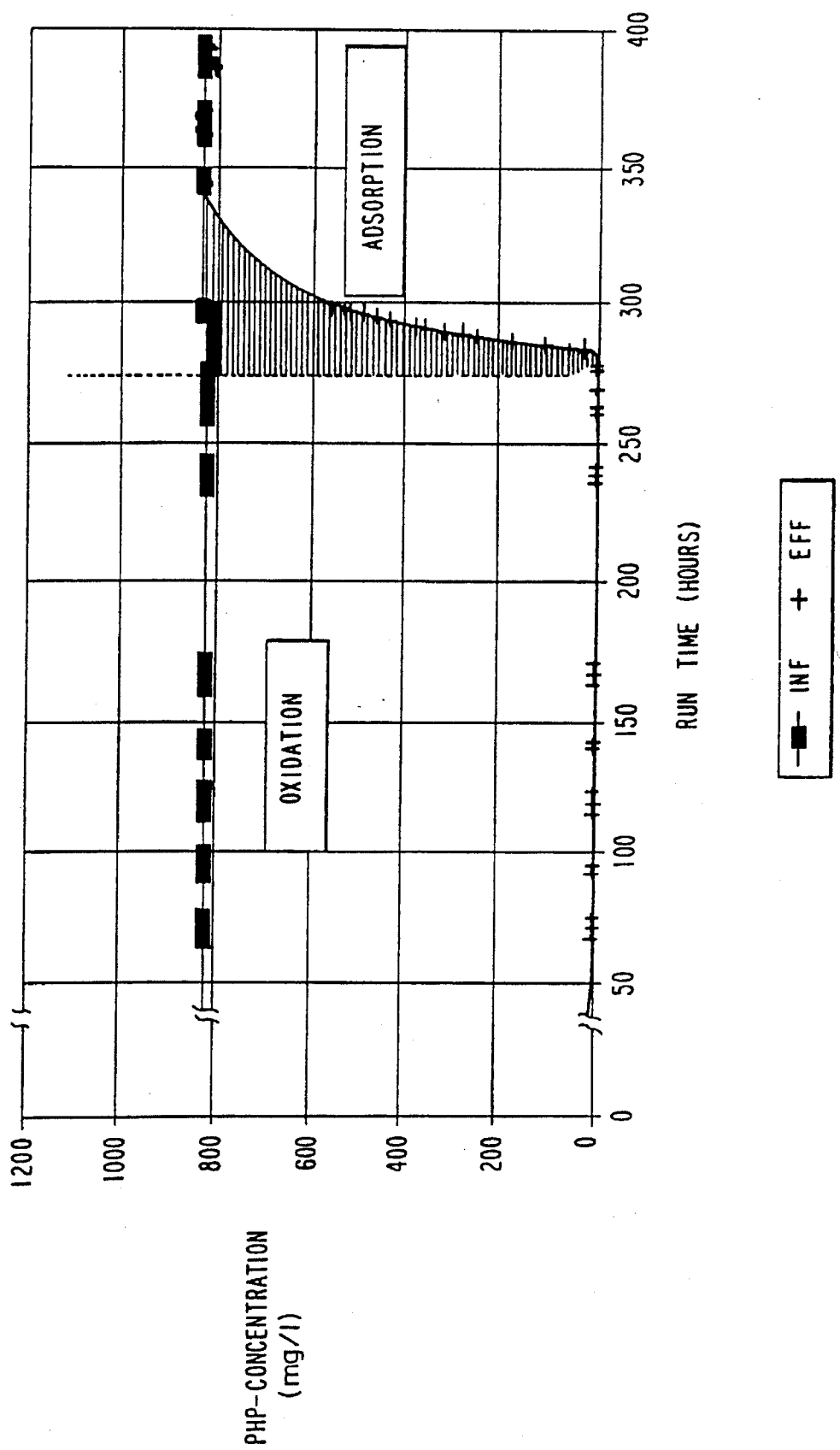
FIG. 3 is a graph depicting steady state within a fixed bed reactor and the concentrations of influent and effluent after the ozone is no longer admitted to the reactor.
Figure 4:
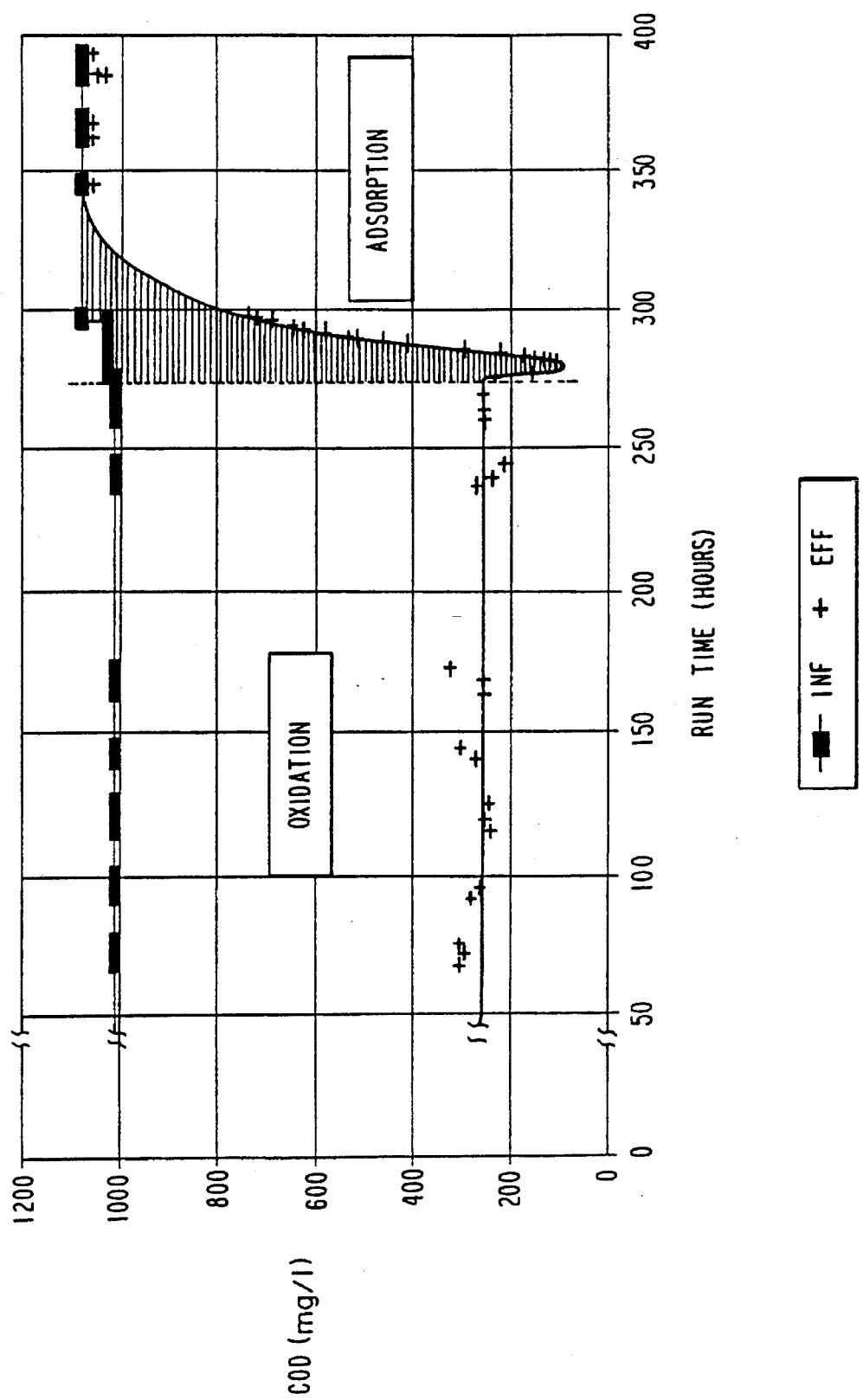
FIG. 4 is a graph similar to FIG. 3 depicting the Chemical Oxygen Demand of contaminant in the reactor effluent during steady state operation, and after the ozone is shut off.

With attention to FIGS. 3 and 4, a reactor of this invention was prepared using as a packed bed, activated carbon having a surface area of at least 50 m²/g and a pore volume greater that 0.1 cm³/g. The influent was an aqueous solution of potassium hydrogen phthalate (PHP), in a concentration of 850 mg PHP per liter and the Chemical Oxygen Demand (COD) for the influent was slightly more than 1,000 mg COD per liter. During the reaction, ozone containing oxygen and PHP solution were continuously fed to the bottom of the reactor and both liquid and gas passed upwardly through the reactor to exit the top. Less than 50 hours into the experiment, steady state operation was attained and virtually all PHP had disappeared (FIG. 3). Under these conditions some partially oxidized contaminants were still present in the effluent as appears from FIG. 4 (the COD of the effluent was 250 mg/l). After about 220 hours of steady state operation the gas flow of ozone was discontinued. As soon as the ozone flow was discontinued, the PHP contaminant concentration in the effluent started to increase (FIG. 3) while the COD of the effluent initially dropped and then began to increase steadily (FIG. 4). The shaded area shown in FIGS. 3 and 4 represents adsorption of PHP by the catalyst in the bed after the ozone flow ceased. Adsorption continued until the concentration of effluent matched the concentration of influent, at which point the cell could be regarded as saturated with contaminants. The accumulative amount of organic material absorbed onto the catalyst after steady state oxidation was stopped is related to the number of free sites available in the carbon bed for oxidation during steady state or continuous operation.

The slight dip in the COD of the effluent at the start of the adsorption phase shown in FIG. 4 represents rapid desorption of ozone from the catalyst surface and subsequent extra adsorption of organic material from the liquid phase onto the catalyst surface. The rate of adsorption decreased when the activated carbon became more and more saturated with organic molecules so that when the effluent concentration reached the influent level, no further adsorption took place and the experiment was then stopped.

During steady state operation, 132 mg COD sites per gram of catalyst or 112 mg PHP sites per gram of catalyst were available for adsorption of PHP. Theoretically, 1.176 mg of oxygen are required to fully oxidize 1 mg of PHP. This is in agreement with the weight ratio found of COD sites to PHP sites.

"Saturated", as used herein, refers to the ratio of the concentration of the contaminants in the effluent to the concentration of the contaminants in the influent to the reactor system expressed as the Chemical Oxygen Demand. Thus, when the effluent concentration approaches the influent concentration the reactor is "saturated" with contaminants and regeneration is required.

It is known that ozone will react with activated carbon and it is known that ozone can be used to regenerate a saturated bed in a cell wherein the organic contaminants fully occupy the available sites on the activated carbon bed. This invention, however, is based upon the discovery that during steady state operation, the activated carbon bed will be continuously regenerated so that the bed does not ever become saturated, requiring regeneration. This is because the ozone selectively reacts with the contaminants rather than with the carbon in the bed under these conditions. If the ozone did not selectively react with the contaminants rather than with the carbon in the bed, oxidation of contaminants would not occur and the bed would become saturated, requiring regeneration as it did when the inflow of ozone ceased. In fact, during steady state operation, it has been found that the reactor system in FIGS. 3 and 4 was only about 25% saturated.

Usually, it is advantageous to operate the reactor system in steady state at low levels of saturation. In particular when it is the intention to remove virtually all contaminants present in a contaminated water stream, the reactor system should be operated at less than 30% and, preferably, less than 10% saturation.

However, in special cases it is economically more advantageous to operate the reactor system in steady state at higher levels of saturation.

Frequently, this is the case when the process of this invention is used in combination with a biotreater. This is often done when there are specific contaminants present that are toxic to organisms in the biotreater such as e.g. cyanides. In such cases it is economically more desirable to use the process of the invention to fully oxidize the toxic component and only part of the rest of the COD. The resulting stream can be treated biologically to remove the rest of the COD. In this way the overall treatment costs can be substantially reduced. In such cases it is often advantageous to operate the reactor system in steady state at more than 50% or even higher levels of saturation.

Purification of products that are sold as aqueous solutions is another important situation. The process of the invention has been used to remove color from a chemical product that was sold as an aqueous solution. The chemical product had some resistance to oxidation and was present in a large concentration. The contaminants that caused the undesired color were present in only small quantities. By operating the reactor system in steady state at near saturation conditions, it was possible to oxidize the contaminants and so remove virtually all of the color and at the same time leave almost all of the valuable product unaffected by the oxidation reactions. In these cases the reactor system should be operated in steady state up to about 70% saturation.

As described above, however, the shaded area in FIGS. 3 and 4 clearly indicates that the bed in that example remains far from saturation during steady state operation. Whereas the experiment in FIGS. 3 and 4 used about 220 hours of operation at steady state, in fact, beds have been in continuous operation for at least 4000 hours according to this invention, without the need to regenerate. The invention described herein depends upon the selective oxidation of the contaminants in aqueous solution, catalyzed by activated carbon whereby steady state operation can be maintained without the need to periodically shut down and regenerate the bed to clear the adsorbed contaminants from the bed surfaces.

This invention is based on a catalytic oxidation process which can be applied homogeneously (UV) or nonhomogeneously (solid catalyst), or as a combination of homogeneous and nonhomogeneous steps. The choice of the equipment is mainly determined by reaction parameters and reaction kinetics of individual toxic components to be removed. Therefore, the apparatus described hereinabove is only by way of example and modifications thereof can be contemplated within the scope of the present invention. This invention is not intended to be limited to whether the process is co-current or countercurrent, or whether the process is carried out in a single bed or in multiple beds in series.

We claim:

1. A continuous process for treatment of contaminated water to remove contaminants therein which comprises the steps of:

providing a reactor system having at least one fixed bed reactor containing a solid catalyst, said catalyst consisting of undoped activated carbon which is therefore free of added heavy metals and said catalyst having a surface area of at least 50 m²/g and a pore volume of at least 0.1 cm³/g;

providing a stream of contaminated water;

providing an ozone containing gas stream;

injecting said ozone stream into said contaminated water stream;

continuously directing said contaminated water stream and said ozone containing stream through said reactor system;

reacting the contaminants in said system with said ozone in a chemical reaction catalyzed by the activated carbon in said reactor to remove contaminants from said stream and to continuously regenerate the activated carbon with said ozone so that the activated carbon remains between about 10% and about 70% saturated with the contaminants during the continuous treatment of said contaminated water.

2. The process of claim 1 wherein the activated carbon in said reactor bed is between about 10% and about 30% saturated.

3. The process of claim 1 wherein the activated carbon in the reactor bed is between about 10% and about 50% saturated.

4. The process of claim 1 wherein the ozone is produced by subjecting oxygen containing gas to UV radiation having a wavelength of less than 200 nm, or by means of an electric discharge.

5. The process of claim 1 wherein said ozone containing gas stream and contaminated water stream are directed co-currently through said reactor system.

6. The process of claim 1 wherein said ozone containing gas stream and contaminated water stream are directed countercurrently through said reactor system.

7. The process of claim 1 wherein said activated carbon is present as granular packing material.

8. The process of claim 1 wherein said activated carbon is present as a coating on inert packing material.

9. The process of claim 1 wherein said injecting step is carried out to establish countercurrent flow through said reactor system, said system comprising a stripping tower containing said activated carbon and having an inlet for said ozone stream on the lower side and on the upper side both a supply for the contaminated water stream and a gas discharge, said system further comprising a UV treating unit connected to the gas discharge and an ozone supply unit connected to said UV treating unit, said UV treating unit having a discharge connected to the ozone stream inlet to said stripping tower, said inlet being part of a recycle loop.

10. The process of claim 9 further comprising providing an additional unit containing a solid catalyst of activated carbon having a surface area of at least 50 m²/g and a pore volume of over 0.1 cm³/g, said unit being connected to a source of ozone and to said gas discharge, and directing a portion of said gas discharge through said unit.

11. The process of claim 1 wherein said injecting step is carried out to establish co-current flow through said system comprising at least one reactor packed with said activated carbon, said at least one reactor being equipped with a contaminated water supply, a water discharge, a gas discharge, a recycle supply for ozone containing liquid, and a recycle discharge for ozone depleted liquid.

12. The process of claim 11 wherein said ozone containing gas stream is provided between the recycle supply and the recycle discharge, said system further comprising an injection system connecting said ozone containing gas stream to said recycle supply.

13. The process of claim 11 wherein the gas discharge is connected via one of a UV treatment unit and a recycle gas discharge, to a venturi incorporated in a liquid recycle loop, said liquid recycle loop being connected to the reactor.

14. The process of claim 11 wherein the gas discharge is connected to an active filter containing a solid catalyst having a surface area of at least 50 m²/g and a pore volume of over 0.1 cm³/g.

* * * * *